United States Patent Office 3,553,077
Patented Jan. 5, 1971

3,553,077
ASBESTOS-PORTLAND CEMENT PIPES WITH MONOETHANOLAMINES, DIETHANOLAMINES, AND TRIETHANOLAMINES AS QUICK-SETTING AGENTS
Stephen Mark Quint, Basking Ridge, N.J., assignor to Johns-Manville Corporation, New York, N.Y., a corporation of New York
No Drawing. Filed Mar. 31, 1967, Ser. No. 627,325
Int. Cl. C04b *13/26, 15/16*
U.S. Cl. 162—154                          10 Claims

ABSTRACT OF THE DISCLOSURE

An improvment in the formation of asbestos-portland hydraulic cement pipe by means of the common wet-forming procedure wherein the ingredients of the product, including portland cement as the binder phase, are collected in the form of a thin wet sheet of furnish from a dilute water suspension thereof, and the thin wet sheet of furnish ingredients is superimposed in layers upon itself into a laminated body such as a section of pipe by convolutely winding and accumulating it about itself while consolidating the superimposed layers into an integrated mass; the improvement constituting reducing slumping or sag in newly formed and yet incompletely hydration set pipe products of such a wet-forming procedure by means of the application of a minor amount of an aqueous solution of alkanol amine from the group of monoethanolamines, diethanolamines, and triethanolamines, to the thin wet sheet of furnish ingredients containing portland cement intermediate its formation by collection of the furnish ingredients from the aqueous suspension and its superimpositioning into a laminated body by convolute winding, accumulating and consolidating into an integrated mass.

BACKGROUND OF THE INVENTION

This invention relates to improvements in conventional manufacturing procedures for asbestos-portland cement pipe wherein a thin wet sheet of the asbestos-portland cement stock ingredients, typically collected from a dilute aqueous slurry of the components with a filter screen activated by pressure differentials, is accumulated by convolute winding on a rotating mandrel and consolidated thereon by the application of pressure into a continuous mass. Upon completion of the forming operation of accumulation and consolidation to the designed wall thickness and density, the resultant incompletely hydrated or set asbestos-cement cylindrical body comprising the pipe is removed from the forming mandrel normally as promptly as is practical for recovery and return of the mandrel for reuse, whereupon the asbestos-cement product is appropriately cured to complete its hydration.

Removal of the supporting mandrel from the incompletely hydrated or set asbestos-cement cylindrical body, however, frequently results in the product slumping from its original round configuration. This slumping, or "sag" as it is commonly referred to in the industry, to out-of-roundness constitutes a detriment which is especially critical in the manufacture of thin walled, large diameter pipe, wherein it normally imposes restrictive production forming rates to prolong mandrel dwell time, and/or requires upon removal of the supporting mandrel burdensome time consuming and costly precautionary handling measures comprising the use of shape retaining end plugs, supporting semi-cradle or saddle racks, and extensive machining of pipe ends, among other remedial means, to prevent or offset sag deformation and enable accurate and sealing alignment and mating of pipe ends with connecting joints and adjacent pipe sections.

Among the assorted approaches proposed and tried by the asbestos-cement industry over the years to overcome this problem of sagging in the manufacture of asbestos-cement pipe has been the use of hydraulic cement hydration accelerating agents in attempts to quicken the setting and hardening of the cementitious mixtures. However, as a result of past trials of the application of common and published hydration accelerating agents and the experience and knowledge acquired therefrom, it has become known in the asbestos-cement industry that the recognized hydraulic cement accelerators are at best substantially ineffective, or detrimental, or both, when applied to asbestos-portland cement stock admixtures utilized in the above described conventional asbestos-cement pipe manufacturing procedures. U.S. Letters Patent No. 3,269,888, for instance, overcomes the problem of sag in the manufacture of pipe from asbestos-hydraulic slag cement stock compositions through the application of sodium silicate, a commonly acknowledged hydraulic cement accelerator, including portland cements, as is evident from U.S. Letters Patent No. 2,987,407 and British Patent No. 908,125, or the literature. Sodium silicate, nevertheless, even when applied pursuant to the means of U.S. Letters Patent No. 3,269,888, in addition to introducing processing difficulties such as clogging the machine felt, has been found to be wholly ineffective in accelerating the initial set in asbestos-portland cement pipe formation and in turn reducing sag when applied in minor and practical proportions, and upon increasing the amounts thereof the advancing acceleration rate thus achieved is accompanied by decreasing strength whereby sodium silicate under any circumstances does not provide an effective and practical remedy. Other commonly known inorganic hydraulic cement accelerating agents for portland cements comprising calcium chloride and sodium carbonate have also been found through experience to be less effective than sodium silicate. U.S. Letters Patent No. 2,437,842 discloses that certain alkanol amines accelerate the setting of portland cements, but teaches their requirement in such high proportions of additive to cement to achieve any discernible quickening in initial set as to appear impractical in costs and to constitute an adulteration or detriment to the product, particularly when considered in the purview of U.S. Letters Patent No. 2,031,621. Moreover the hydraulic cement additives generally are known in the industry to be especially erratic in their activity in cementitious materials whereby there is an acknowledged decided lack of any certainty and absence of predictability as to their effects, either beneficial or detrimental.

SUMMARY OF THE INVENTION

This invention comprises an improvement in the manufacture of asbestos-portland cement pipe products formed by accumulating a thin wet sheet, or sheets, of asbestos-portland cement stock ingredients through convolute winding of the sheet(s) upon a rotating mandrel while compressing to consolidate the material accumulated thereon, and is founded in the singular discovery that relatively minor proportions of a specific class of alkanol amines applied to the thin wet sheet of asbestos-portland cement stock ingredients effectively and markedly quicken the initial setting and hardening of asbestos-portland cement mixtures to the extent of reducing sag in resulting pipe products up to 85 or 90%, or more, over like produced pipe but without the treatment of this invention.

It is the principal object of this invention to provide an effective and practical means of markedly reducing and controlling sag or slumping to out-of-roundness in the formation of asbestos-portland cement pipe, and thereby achieve numerous attendant advantages and generally expedite the overall manufacturing operation, without the introduction of deleterious effects such as diminishing strength, or degrading the product in any aspect.

DESCRIPTION OF PREFERRED EMBODIMENTS

The improvement of this invention in forming asbestos-portland cement pipe, constituting the discovery that the initial setting, or incipient cement hydration, of typical asbestos-portland cement stock compositions can be rapidly quickened and advanced to the extent of rendering normal asbestos-portland cement pipe products, unsupported upon removal of the forming mandrel, sufficiently rigid to effectively resist sag within a relatively brief period of only about 15 to about 30 minutes, depending upon pipe diameter, wall thickness, etc., following inception of formation by initiating accumulation of the sheet of stock through convolute winding about the mandrel, by means of the direct application of very minimal amounts of a select group of alkanol amines under prescribed conditions. Application of the given alkanol amines of the invention essentially is effected by directly administering the amine to the thin wet sheet as asbestos-portland cement stock, following its formation which typically in a conventional operation is produced by collecting upon a filter screen with a hydraulic pressure differential the solids of the stock ingredients with entrained liquid from a dilute water suspension thereof, prior to the accumulation of the thin wet sheet of ingredients by convolute winding upon the mandrel.

Requisite alkanol amines for the practice of this invention consist of the substantially water soluble monoethanolamines, diethanolamines and triethanolamines, or mixtures thereof. Triethanolamine is preferred since it achieves optimum retardation of sag with a minimum of adverse effects. These alkanol amines were discovered to be highly effective in rapidly and substantially quickening the initial set of asbestos-portland cement compositions in the manufacture of pipe when applied in such minimal proportions of about 0.01% by weight of the alkanol amine based upon the total weight of the dry asbestos-portland cement stock composition, and typically for substantially any portland cement manufacture, amounts of about 0.02 up to about 2.0% by weight of amine based upon the total dry stock. Preferred proportions for normally optimum results comprise about 0.02 or 0.03 up to about 1.0%, since with most stock compositions the degree of sag reduction achieved with increased proportions is not proportionally or even discernible extended, and because of the potential hazard of degrading the product or disrupting the manufacturing process.

The physical application of the aqueous amine solution can be achieved with any means which accurately and uniformly applies liquids, including commercial spray apparatus, overflow troughs and common liquid distributors, roll applicators, etc. Spray applicators normally provide the most effective means and are therefore preferred.

The amines of this invention are water soluble and are applied in aqueous solution to render the treatment compatible with the asbestos-portland cement system. The solution concentration of the aqueous solution of alkanol amines applied has not been found to be a critical factor except that as a practical matter it should be relatively dilute, for example less than about 5% by weight of alkanol amine and preferably about 2% or less, e.g., about 1.0% to about 0.1%, to facilitate accurate and uniform addition of such very minor but critical proportions of the given amine administered to the cementitious material. Moreover, it may be desirable to coordinate the amounts of water incidentally added to the wet cementitious material as a dispersing medium or solvent for the amine with the original water content of the wet cementitious material to which the amine solution is administered to control or minimize blistering due to improper water content while building up the product by superimposing and consolidating layers thereof. Thus the combined water present resulting from the initial water content entrained in the asbestos-cement material and that added along with the amine should be designed to be within acceptable tolerances to avoid blistering or other adverse effects attributable to excess water during forming.

The hereinafter examples demonstrate the appreciable reductions in sag or slumping of newly formed asbestos-portland cement products attributable to the application of this invention of up to about 80 to 90% or more of the measured linear sag from initial dimensions over like products identically produced but without the means of this invention, or in relation to other agents and/or with other means of administration. Further these examples also demonstrate that the application of this invention does not introduce unwanted or undesirable effects, particularly reduced strength, as is common with other and apparently similar treatments embodying purported analogous agents or somewhat similar means of administration. These examples additionally illustrate preferred and effective operating procedures, conditions and materials as to various aspects of the invention and their adaptability to conventional asbestos-cement manufacturing equipment and operations together with their decided overall upgrading and enhancement thereof. It is to be understood that the specific means or techniques, conditions, materials and/or proportions thereof given in the examples and asbestos-cement formulations set forth are primarily exemplary, and are not to be construed as limiting the invention to any particular details or specific means or materials recited in these examples.

As a measure to expedite and control the variables of testing and evaluating the means of this invention, and to provide reproduceable or like circumstances therefor as a standard and for comparison with other agents, conditions, formulations, etc. to a degree of standardization and/or regulation not fully practical or possible in many aspects or instances with large scale pilot plant or factory production equipment, a standardized test has been adopted and extensively employed for the development and exploration of asbestos-cement compositions in general, and of this invention in particular. This test, referred to hereinafter as the "sag cake test" and comprising a controllable and reproduceable means of evaluation and obtaining the data and relative results set forth in certain of the following examples, was applied under identical conditions, and each illustration thereof set forth in the examples, unless specified otherwise, was performed pursuant to the following procedure.

SAG CAKE TEST PROCEDURE

The basic steps of this test are put into effect or carried out according to a predetermined time schedule as given, and an appropriate timing mechanism is employed in connection therewith. Initially, a dry, thoroughly mixed (10 minute agitation) 150 gm. sample of stock of the particular asbestos-cement formulation to be evaluated is prepared for each cake test, and added to 1000 milliliters of distilled water with the mixing thereof commencing immediately at 0:00 minute. After mixing 1:00 minute, the wet admixture of stock is promptly transferred to a vacuum filter box measuring 3 in. x 8 in. and having a bottom perforated plate of like dimensions covered with filter paper, and at 1:15 minutes a vacuum is applied to the filter box. The vacuum should be such as to register 16 in. of mercury during removal of water and between 13 and 13.5 in. of mercury thereafter throughout the remainder of the filtering operation which continues for a duration of 3 minutes and 45 seconds. Upon withdrawal of the excess water a 25 lb. hand tamp is placed on the top of the cake for 10 seconds to smooth its upper surface, and at 5:00 minutes the vacuum is removed. In the 5:00 to 6:00 minute interval the cake is removed from the filter box and in the 6:00 to 6:30 minute interval the cake is weighed. From 6:30 to 7:05 minutes the cake is placed in a press and then consolidated at a pressure of 320 p.s.i. applied across the entire 3 in. x 8 in. cake surface over 10 seconds at a uniform rate of loading using 3 to 4 strokes to reach maximum load. The application of pressure should start at about 6:50 minutes with maximum load being reached at 7:00 minutes and maintained until 7:05 minutes. From 7:05 to 9:00 minutes the press cake is again weighed and then set up for the sag test.

Next, the cake is prepared for measuring its sag or deviation from horizontal under a given load by placing the 3 in. x 8 in. cake across anvils positioned at each end of a base sheet providing an intermediate 6 in. free span and with a releasable center support to hold the test cake horizontally across the span between the anvils before the test is started. A foot or base of a gauge micrometer with an added dead weight of 140.0 gms. is mounted centrally between the anvils and positioned on the upper surface of the test cake. The micrometer reading is taken to determine the location of the surface of the cake as a basis for the subsequent sag measurement. At 9:00 minutes the center support between the anvil holding the intermediate section of the cake is released and a reading on the micrometer taken at 10:00 minutes and/or at other subsequently specified intervals. This reading is subtracted from the initial reading giving the sag or deviation from the horizontal due to the combined weight of the cake itself and the load applied from the micrometer assembly.

Upon completion of the sag measurement, the cake is removed from the tester and carefully straightened on a flat plate and placed for 24 hours in a moisture cabinet held at 90±3° F. and at least 90% relative humidity. This is followed by 16 hours in an autoclave at 100 p.s.i. saturated steam (337.8° F.). After the curing cycle the cake is cooled to room temperature and submerged for 24 hours in fresh water at 73±3° F., removed and the saturated cake weight determined in both air and water. Then the flexural strength of the cake is determined in accordance with ASTM Specification C-223-55 on a suitable testing device having a test span of 6 in. and the breaking load recorded. Last, the broken cake is placed in a ventilated oven at 212 to 220° F. and dried for 48 hours, cooled in a desiccator and the dry weight determined for use in water absorption and density calculation.

Example I

A series of sets of samples of like asbestos-cement formulations with each set comprising a commercial hydraulic setting portland cement of different manufacture, and each composed of 20% by weight of asbestos fiber, 50% by weight of portland cement of a given manufacturer, and 30% by weight of silica, were evaluated and compared by submitting all samples to the foregoing described sag cake test both without the application of an alkanol amine and with its administration in varying amounts by direct addition to the 1000 ml. of initial mix water for the stock suspension to provide control samples and data therefrom as standards, and with the application of triethanolamine in given varying amounts pursuant to this invention simulated by pouring the triethanolamine solution directly over the formed sag cake sample in the filler box while under vacuum and prior to the hand tamp. The linear reduction in sag and percentage change attributable to each means, i.e., the inclusion of the triethanolamine agent in the mix water providing the water suspension of the furnish ingredients containing National portland cement, and to the means of administration of this invention, as well as other pertinent data for asbestos-portland cement materials of the aforesaid proportions and comprising respectively National cement, Universal Atlas cement, Ideal cement and Foreman cement, are all set forth in the following Tables I, II, III, IV and V, respectively. The data provided therein demonstrates the effectiveness achieved through the means of this invention wherein the application of only very minor proportions of triethanolamine, e.g., 0.03% by weight based upon the weight of the total solids, resulted in reductions in sag of 83, 67, 81%, and with 0.04% a 90.2% reduction over the control, without significant effects upon the strength of the product, and also in relation to the effects of including the same additive in the mix water and thus the water suspension of the furnish ingredients wherein an addition of the same amount of 0.03% by weight based upon the solids, only achieved a reduction of 20% over the control.

TABLE I.—TRIETHANOLAMINE ADDED TO MIX WATER FOR SAG CAKE OF NATIONAL CEMENT

| Percent triethanolamine based on total dry solids | Number of samples | S/C ratio | Filter time, sec. | Water retention, percent | | Modulus of rupture, p.s.i. | | | | Sag, in. | Break load, lbs. | Thickness, in. | Dry density, p.c.f. | Change in sag, percent |
|---|---|---|---|---|---|---|---|---|---|---|---|---|---|---|
| | | | | Filter | Pressure | Min. | Max. | Avg. | Standard deviation | | | | | |
| Control, no additive | 4 | 0.6/1 | 107 | 50.2 | 30.2 | 4,030 | 4,330 | 4,190 | 156 | .071 | 112.7 | .278 | 87.7 | |
| 0.005 | 4 | 0.6/1 | 106 | 48.8 | 30.1 | 3,750 | 4,310 | 4,070 | 275 | .058 | 110.7 | .280 | 87.8 | −18 |
| 0.01 | 4 | 0.6/1 | 105 | 49.6 | 30.3 | 3,710 | 4,480 | 4,080 | 141 | .057 | 109.7 | .278 | 86.9 | −20 |
| 0.03 | 4 | 0.6/1 | 111 | 48.9 | 30.1 | 3,620 | 4,290 | 4,120 | 134 | .057 | 110.5 | .278 | 87.6 | −20 |

TABLE II.—EFFECT OF TRIETHANOLAMINE SOLUTION POURED ON SAG CAKE OF NATIONAL CEMENT

| Percent triethanolamine based on total dry solids | Number of samples | S/C ratio | Filter time, sec. | Water retention, percent | | Modulus of rupture, p.s.i. | | | | Sag, in. | Break load, lbs. | Thickness, in. | Dry density, p.c.f. | Change in sag, percent |
|---|---|---|---|---|---|---|---|---|---|---|---|---|---|---|
| | | | | Filter | Pressure | Min. | Max. | Avg. | Standard deviation | | | | | |
| Control, no additive | 4 | 0.6/1 | 91 | 45.9 | 28.3 | 4,220 | 4,530 | 4,440 | 154 | .143 | 118.8 | .276 | 87.3 | |
| 0.005 | 4 | 0.6/1 | 89 | 45.9 | 27.9 | 4,110 | 4,740 | 4,350 | 231 | .142 | 112.1 | .271 | 87.7 | |
| 0.01 | 4 | 0.6/1 | 94 | 45.3 | 28.0 | 4,300 | 4,620 | 4,440 | 132 | .116 | 116.4 | .273 | 88.0 | −18.9 |
| 0.02 | 4 | 0.6/1 | 91 | 45.7 | 28.6 | 4,260 | 4,610 | 4,420 | 163 | .038 | 115.0 | .273 | 87.8 | −73.4 |
| 0.03 | 4 | 0.6/1 | 90 | 45.2 | 29.3 | 4,280 | 4,490 | 4,390 | 100 | .024 | 117.8 | .277 | 87.6 | −83.2 |

TABLE III.—EFFECT OF TRIETHANOLAMINE SOLUTION POURED ON SAG CAKE OF UNIVERSAL ATLAS CEMENT

| Percent triethanolamine based on total dry solids | Number of samples | S/C ratio | Filter time, sec. | Water retention, percent | | Modulus of rupture, p.s.i. | | | | Sag, in. | Break load, lbs. | Thickness, in. | Dry density, p.c.f. | Change in sag, percent |
|---|---|---|---|---|---|---|---|---|---|---|---|---|---|---|
| | | | | Filter | Pressure | Min. | Max. | Avg. | Standard deviation | | | | | |
| Control, no additive | 4 | 0.6/1 | 76 | 46.9 | 29.7 | 4,070 | 4,290 | 4,180 | 94 | .051 | 114.1 | .280 | 90.5 | |
| 0.005 | 4 | 0.6/1 | 76 | 46.9 | 29.2 | 3,590 | 4,050 | 3,830 | 229 | .038 | 104.0 | .279 | 90.1 | −25 |
| 0.01 | 4 | 0.6/1 | 79 | 47.3 | 29.9 | 3,730 | 4,200 | 4,030 | 210 | .028 | 108.8 | .278 | 89.4 | −45 |
| 0.02 | 4 | 0.6/1 | 79 | 47.5 | 30.5 | 3,640 | 4,000 | 3,850 | 163 | .021 | 106.1 | .282 | 89.0 | −59 |
| 0.03 | 4 | 0.6/1 | 79 | 48.2 | 31.2 | 3,650 | 4,110 | 3,850 | 273 | .017 | 108.7 | .284 | 88.9 | −67 |

TABLE IV.—EFFECT OF TRIETHANOLAMINE SOLUTION POURED ON SAG CAKE OF IDEAL CEMENT

| Percent triethanolamine based on total dry solids | Number of samples | S/C ratio | Filter time, sec. | Water retention, percent | | Modulus of rupture, p.s.i. | | | | Sag, in. | Break load, lbs. | Thickness, in. | Dry density, p.c.f. | Change in sag, percent |
|---|---|---|---|---|---|---|---|---|---|---|---|---|---|---|
| | | | | Filter | Pressure | Min. | Max. | Avg. | Standard deviation | | | | | |
| Control, no additive | 3 | 0.6/1 | 82 | 50.7 | 31.5 | 3,980 | 4,200 | 4,100 | | .107 | 114.9 | .283 | 83.6 | |
| 0.01 | 3 | 0.6/1 | 83 | 46.6 | 31.0 | 4,210 | 4,380 | 4,290 | | .016 | 119.2 | .282 | 83.7 | −85 |
| 0.02 | 3 | 0.6/1 | 82 | 46.8 | 31.9 | 3,990 | 4,160 | 4,060 | | .017 | 114.5 | .285 | 83.6 | −84 |
| 0.03 | 3 | 0.6/1 | 85 | 47.1 | 32.0 | 3,800 | 4,150 | 3,950 | | .020 | 113.7 | .286 | 82.5 | −81 |

TABLE V.—EFFECT OF TRIETHANOLAMINE SOLUTION POURED ON SAG CAKE OF FOREMAN CEMENT

| Percent triethanolamine based on total dry solids | Number of samples | S/C ratio | Filter time, sec. | Water retention, percent | | Modulus of rupture, p.s.i. | | | | Sag, in. | Break load, lbs. | Thickness, in. | Dry density, p.c.f. | Change in sag, percent |
|---|---|---|---|---|---|---|---|---|---|---|---|---|---|---|
| | | | | Filter | Pressure | Min. | Max. | Avg. | Standard deviation | | | | | |
| Control, no additive | 4 | 0.6/1 | 75 | 46.0 | 29.6 | 3,780 | 4,180 | 4,000 | 166 | .132 | 108.7 | .279 | 85.8 | |
| 0.02 | 4 | 0.6/1 | 71 | 46.3 | 30.6 | 3,450 | 4,100 | 3,820 | 271 | .021 | 105.7 | .281 | 85.2 | −84.1 |
| 0.04 | 4 | 0.6/1 | 73 | 46.5 | 31.7 | 3,720 | 4,020 | 3,840 | 142 | .013 | 107.4 | .282 | 84.4 | −90.2 |
| 0.06 | 4 | 0.6/1 | 77 | 46.9 | 32.4 | 3,480 | 4,060 | 3,880 | 273 | .009 | 111.1 | .286 | 84.1 | −93.2 |

Example II

The effect of applying the triethanolamine agent of this invention by direct addition to the dilute water suspension of the ingredients comprising the asbestos-cement furnish under conditions simulating factory production with typical asbestos-cement wet forming equipment and operating techniques comprising recycling and reuse of the process water in the suspension is demonstrated in this example with a series of sag cake tests wherein production conditions are duplicated by a reuse of the filtrate from the previous sag cake formation with the addition of a small amount of make-up water to provide the requisite 1,000 cc. and of triethanolamine to provide the stated amount based upon the total dry stock ingredients of the furnish. In each of these runs all samples consisted of 20% by weight of asbestos fiber, 30% by weight of silica and 50% by weight of National cement. Four series of 10 samples each were subjected to the sag cake test according to the aforedescribed procedure with the first series of 10 samples representing a control wherein the filtrate was similarly reused with make-up water added to provide 1,000 cc. for each mix but without any triethanolamine, and the second, third and fourth series were each carried out reusing the filtrate from the previous test of that series containing added thereto an amount of make-up water to provide 1,000 cc. and the given amounts of triethanolamine specified based upon the total dry stock of the asbestos-cement furnish. The degree of sag measured in inches for each sample was as set forth in the following Table VI. From the resulting sag data it is evident that upon the completion of the first few cycles, the application of triethanolamine by addition into the stock of the water suspension of ingredients becomes completely ineffective in reducing sag.

TABLE VI.—EFFECT OF REUSING FILTRATE WITH TRIETHANOLAMINE IN MIX WATER

| Cake No.: | Control, no additive | 0.05 percent triethanolamine* | 0.075 percent triethanolamine* | 0.10 percent triethanolamine* |
|---|---|---|---|---|
| 1 | 0.063 | 0.035 | 0.019 | 0.032 |
| 2 | 0.122 | 0.018 | 0.137 | 0.058 |
| 3 | 0.123 | 0.060 | 0.110 | 0.070 |
| 4 | 0.143 | 0.025 | 0.160 | 0.130 |
| 5 | 0.140 | 0.039 | 0.110 | 0.109 |
| 6 | 0.140 | 0.121 | 0.135 | 0.128 |
| 7 | 0.143 | 0.112 | 0.124 | 0.151 |
| 8 | 0.138 | 0.140 | 0.122 | 0.140 |
| 9 | 0.136 | 0.114 | 0.140 | 0.150 |
| 10 | 0.145 | 0.135 | 0.153 | 0.136 |

* Based on total dry stock.

Example III

Two series of runs comprising the manufacture of asbestos-cement pipe were carried out on a conventional asbestos-cement wet process machine of reduced, pilot plant scale with the first series of runs comprising the manufacture of pipe sections containing no additive and representing a control, and with the second series of pipe sections produced under identical conditions of that of the control series except for the application of approximately 0.02% of triethanolamine, based on the weight of the dry furnish of the asbestos cement stock, in the form of an 0.2% aqueous solution of the triethanolamine. This solution was applied by spraying upon the thin wet sheet of asbestos-cement furnish subsequent to its collection on the rotary filter mold and transfer to the machine felt and prior to passing over the vacuum box and the following accumulation and consolidation by convolute winding upon the mandrel and its compression thereon. A number of one foot samples were cut from both the control and triethanolamine treated pipe products and the inside diameter measured before and after application of a load of 29 pounds per foot when the samples were 15 minutes old. The triethanolamine treated pipe products sagged an average of 70% less than that of the control pipe samples. Approximately 30 minutes after the last 1 foot pipe sample was cut, a person weighing 160 pounds stood on each of the 1 foot section samples, and all triethanolamine treated samples maintained their roundness while all control samples immediately collapsed flattening out completely until the upper and lower sections made contact. Strength evaluations of the pilot plant machine pipe showed no significant difference between the control and triethanolamine treated pipe in hydro MR, crush MR, density and water absorption, but the treated pipe was about 9% lower in flexural MR, which may be due to the control pipe requiring a longer average formation time. Data derived from this test is set forth in Table VII.

TABLE VII.—PILOT PIPE MACHINE DATA

| | Control, no spray | 0.02% triethanolamine spray |
|---|---|---|
| Form time (sec.): | | |
| Minimum | 61 | 53 |
| Maximum | 90 | 88 |
| Average | 73 | 69 |
| Number | 22 | 30 |
| Hydrostatic MR p.s.i.: | | |
| Minimum | 3,200 | 3,510 |
| Maximum | 5,320 | 5,040 |
| Average | 4,630 | 4,510 |
| Number | 10 | 15 |
| Flexure MR p.s.i.: | | |
| Minimum | 5,350 | 4,910 |
| Maximum | 6,540 | 6,300 |
| Average | 6,140 | 5,600 |
| Number | 10 | 12 |
| Normal crush MR p.s.i.: | | |
| Minimum | 8,460 | 7,830 |
| Maximum | 10,380 | 10,110 |
| Average | 9,460 | 9,110 |
| Number | 10 | 12 |
| Saturated crush MR p.s.i.: | | |
| Minimum | 7,560 | 7,160 |
| Maximum | 9,200 | 9,270 |
| Average | 8,520 | 8,200 |
| Number | 10 | 12 |
| Water absorption, percent: | | |
| Minimum | 18.3 | 18.3 |
| Maximum | 19.4 | 19.5 |
| Average | 18.6 | 18.9 |
| Number | 10 | 12 |

TABLE VII.—Continued

| | Control, no spray | 0.02% triethanol-amine spray |
|---|---|---|
| Dry density p.c.f.: | | |
| Minimum | 107.1 | 108.3 |
| Maximum | 109.8 | 110.3 |
| Average | 109.1 | 109.1 |
| Number | 10 | 12 |
| Sag of pipe [1] inches: | | |
| Minimum | 0.055 | 0.055 |
| Maximum | 0.090 | 0.045 |
| Average | 0.070 | [2] 0.022 |
| Number | [3] 4 | [4] 6 |

[1] (Change in ID after loading 29 lb. on 1-ft. sample cut from pipe. Sag performed 15 minutes after pipe formation.)
[2] (70% reduction.)
[3] (Average wall 0.65".)
[4] (Average wall 0.63".)

Example IV

A more salient demonstration of the indispensability and marked influence of the distinct and singular means of this invention beyond that produced by the sag cake tests of Example II, comprises the following comparative evaluation carried out in an asbestos-cement pipe manufacturing operation with a pilot plant machine, and consisting of three separate runs. The first run provided a control or standard employing no additive. In the second run a 1% aqueous solution of triethanolamine in amount of 0.05% by weight based on the solids of the asbestos-cement composition, was sprayed upon the thin wet sheet of the asbestos-cement furnish ingredients following its formation by extraction of the furnish solids with the rotary filter screen from the vat of water suspension of ingredients and prior to the convolute accumulation and consolidation upon the mandrel. The third run consisted of the direct addition of the same 1% aqueous solution of triethanolamine into the mix water in the vat of water suspension of ingredients and thorough admixing therewith prior to extraction of the furnish solids with the rotary filter screen from the vat of the slurry and formation of the sheet and its accumulation into a pipe product, in an amount to provide the same 0.05% by weight of triethanolamine based on the solids content of the dilute aqueous slurry and as such equivalent to the amount applied to the second run. The asbestos-cement composition of the furnish in each run consisted of 20% by weight of fiber, 30% by weight of silica and 50% by weight of portland cement. Three samples of pipe were made and measured for each of the three runs, and an average sag for each run was determined by cutting a one foot test section from each sample of pipe, taking a vertical inside diameter measurement and when each sample was 5 minutes old placing a 28.5 pound weight thereon and again measuring the vertical inside diameter following the application of the load. The average difference was the sag for each phase, which was as follows:

TABLE VIII

| | Sag of pipe (in.) | Percent change in sag |
|---|---|---|
| Control | 0.111 | |
| 0.05% triethanolamine spray on sheet | 0.011 | −90 |
| 0.05% triethanolamine in vat | 0.144 | +30 |

Thus in an actual manufacturing operation, the distinct application of the present invention achieves an average of 90% in reduction in sag whereas the direct means of application of the additive agent into the mix of the water suspension and ingredients actually affected a substantial increase in sag when applied to a typical asbestos portland cement composition and common manufacturing process.

Example V

A series of sag cake tests were conducted to evaluate the relative effects of a number of common purported cement additives including related amines when applied pursuant to the means of this invention. As before, the aqueous solutions of these additives given hereinafter were added by pouring the solution over the formed sag cake sample in the filter box while under vacuum and prior to compression by hand tamping to effectively simulate administration to the wet sheet on a forming machine subsequent to its withdrawal from the slurry and prior to build up and consolidation upon the accumulating roll or mandrel. The asbestos-cement formulation for the composition of the said cakes was in each case 20% fiber, 50% National cement and 30% silica. The common purported additives and related amines consisted of calcium chloride, sodium carbonate, sodium silicate, morpholine, dimethyl ethanolamine, triisopropanolamine, monoethanolamine, diethanolamine and triethanolamine. The data derived from each of these series of sag cake tests, each comprising several samples run without any additive for a control, and with the enumerated additives in the given percentage of applications administered pursuant to the means of this invention, are as set forth in Tables IX through XVI respectively. The results of this series of comparative evaluations of effects of common cement accelerators and related amines upon the sag of wet process formed asbestos-portland cement products, when applied by the means of the invention, unequivocally demonstrate that it is only monoethanolamine, diethanolamine and triethanolamine which effectively reduce sag without destroying the strength of the resultant product.

TABLE IX.—CALCIUM CHLORIDE ADDITION

| Percent calcium chloride added | Number of samples | S/C ratio | Filter time, Sec. | Water retention percent | | Modulus of rupture, p.s.i. | | | | Sag, in. | Break load, lb. | Thickness, in. | Dry density, p.c.f. | Percent change in sag | Percent change in MR |
|---|---|---|---|---|---|---|---|---|---|---|---|---|---|---|---|
| | | | | Filter | Pressure | Min. | Max. | Avg. | Standard deviation | | | | | | |
| 0—control | 4 | 0.6/1 | 82 | 43.9 | 28.3 | 4,260 | 4,560 | 4,410 | 126 | .123 | 118.8 | .278 | 87.4 | | |
| 0.02 | 4 | 0.6/1 | 77 | 45.5 | 29.3 | 4,320 | 4,420 | 4,350 | 46 | .134 | 118.5 | .278 | 87.3 | +8.9 | −1.4 |
| 0.04 | 4 | 0.6/1 | 86 | 45.5 | 28.3 | 4,300 | 4,480 | 4,380 | 77 | .123 | 119.5 | .279 | 87.3 | | −0.7 |
| 0.08 | 4 | 0.6/1 | 84 | 45.3 | 29.7 | 4,140 | 4,320 | 4,210 | 76 | .128 | 115.9 | .281 | 89.1 | +4.1 | −4.5 |
| 0.10 | 4 | 0.6/1 | 83 | 45.7 | 29.2 | 4,280 | 4,460 | 4,360 | 77 | .133 | 119.5 | .280 | 86.5 | +8.1 | −1.1 |
| 0—control | 4 | 0.6/1 | 87 | 44.5 | 28.6 | 4,360 | 4,440 | 4,410 | 38 | .102 | 117.8 | .276 | 89.1 | | |
| 0.5 | 4 | 0.6/1 | 88 | 45.1 | 29.3 | 4,300 | 4,500 | 4,420 | 98 | .101 | 118.9 | .277 | 86.7 | | |
| 1.0 | 4 | 0.6/1 | 90 | 44.9 | 28.5 | 4,340 | 4,560 | 4,450 | 91 | .118 | 116.2 | .272 | 89.6 | +15.7 | +0.7 |
| 1.5 | 4 | 0.6/1 | 90 | 46.1 | 29.6 | 4,250 | 4,450 | 4,340 | 91 | .112 | 115.5 | .276 | 89.3 | +9.8 | −1.6 |
| 2.0 | 4 | 0.6/1 | 89 | 45.7 | 30.7 | 4,200 | 4,390 | 4,310 | 88 | .089 | 116.4 | .279 | 88.6 | −12.7 | −2.3 |

[1] Based on total solids.

TABLE X.—Sodium carbonate addition

| Percent sodium carbonate added [1] | Number of samples | S/C ratio | Water retention percent | | Modulus of rupture, p.s.i. | | | | Sag, in. | Break load, lb. | Thickness, in. | Dry density p.c.f. | Percent change in sag | Percent change in MR |
|---|---|---|---|---|---|---|---|---|---|---|---|---|---|---|
| | | | Filter time, sec. | Pressure | Min. | Max. | Avg. | Standard deviation | | | | | | |
| 0—control | 4 | 0.6/1 | 85 | 43.9 | 28.2 | 5,030 | 5,540 | 5,210 | 228 | .127 | 143.0 | .281 | 87.4 | | |
| 0.02 | 4 | 0.6/1 | 85 | 47.1 | 30.7 | 4,790 | 5,170 | 4,960 | 200 | .129 | 136.0 | .280 | 86.1 | +1.6 | −4.8 |
| 0.04 | 4 | 0.6/1 | 84 | 45.8 | 28.9 | 5,170 | 5,340 | 5,230 | 79 | .118 | 141.0 | .279 | 86.3 | −7.0 | +0.4 |
| 0.08 | 4 | 0.6/1 | 84 | 45.3 | 28.6 | 4,670 | 5,080 | 4,850 | 173 | .128 | 133.0 | .280 | 86.5 | +0.8 | −6.9 |
| 0.10 | 4 | 0.6/1 | 88 | 45.5 | 29.3 | 4,870 | 5,130 | 5,010 | 114 | .128 | 135.0 | .278 | 86.3 | +0.8 | −3.8 |
| 0—control | 4 | 0.6/1 | 85 | 43.5 | 28.5 | 4,410 | 4,680 | 4,500 | 124 | .135 | 119.4 | .276 | 89.2 | | |
| 0.5 | 4 | 0.6/1 | 84 | 48.3 | 31.1 | 4,220 | 4,380 | 4,300 | 85 | .099 | 119.8 | .284 | 87.4 | −26.7 | −4.4 |
| 1.0 | 4 | 0.6/1 | 85 | 47.9 | 31.2 | 4,310 | 4,490 | 4,390 | 85 | .086 | 119.1 | .279 | 86.0 | −36.3 | −2.4 |
| 1.5 | 4 | 0.6/1 | 85 | 48.7 | 32.4 | 4,260 | 4,370 | 4,310 | 43 | .088 | 120.0 | .283 | 87.1 | −34.8 | −4.2 |
| 2.0 | 4 | 0.6/1 | 83 | 48.5 | 31.6 | 4,210 | 4,580 | 4,400 | 160 | .074 | 119.0 | .279 | 87.3 | −45.2 | −2.2 |

[1] Based on total solids.

TABLE XI.—Sodium silicate addition

| Percent sodium silicate added [1] | Number of samples | S/C ratio | Water retention percent | | Modulus of rupture, p.s.i. | | | | Sag, in. | Break load, lb. | Thickness, in. | Dry density p.c.f. | Percent change in sag | Percent change in MR |
|---|---|---|---|---|---|---|---|---|---|---|---|---|---|---|
| | | | Filter time, sec. | Pressure | Min. | Max. | Avg. | Standard deviation | | | | | | |
| 0—control | 4 | 0.6/1 | 81 | 44.3 | 28.3 | 4,310 | 4,590 | 4,480 | 122 | .125 | 120.0 | .277 | 85.5 | | |
| 0.02 | 4 | 0.6/1 | 81 | 45.5 | 29.2 | 4,330 | 4,400 | 4,370 | 31 | .119 | 119.9 | .281 | 85.4 | −4.8 | −2.5 |
| 0.04 | 4 | 0.6/1 | 83 | 46.4 | 29.5 | 4,240 | 4,400 | 4,320 | 69 | .123 | 119.3 | .281 | 84.8 | −1.6 | −3.6 |
| 0.08 | 4 | 0.6/1 | 86 | 46.6 | 29.1 | 4,300 | 4,420 | 4,360 | 54 | .115 | 118.6 | .279 | 82.6 | −8.0 | −2.7 |
| 0.10 | 4 | 0.6/1 | 86 | 45.9 | 29.5 | 4,270 | 4,370 | 4,300 | 48 | .114 | 118.6 | .280 | 85.0 | −8.8 | −4.0 |
| 0—control | 4 | 0.6/1 | 90 | 43.9 | 29.5 | 4,340 | 4,720 | 4,490 | 165 | .122 | 120.2 | .277 | 88.8 | | |
| 0.5 | 4 | 0.6/1 | 90 | 50.8 | 32.9 | 3,820 | 4,150 | 4,010 | 138 | .054 | 115.1 | .286 | 86.4 | −55.7 | −10.7 |
| 1.0 | 4 | 0.6/1 | 90 | 54.6 | 35.7 | 3,600 | 3,920 | 3,690 | 188 | .040 | 110.6 | .294 | 83.6 | −67.2 | −17.8 |
| 1.5 | 4 | 0.6/1 | 91 | 58.1 | 39.2 | 3,080 | 3,700 | 3,470 | 290 | .042 | 108.5 | .298 | 82.4 | −65.6 | −22.7 |
| 2.0 | 4 | 0.6/1 | 91 | 60.0 | 41.2 | 3,430 | 3,900 | 3,650 | 214 | .034 | 114.5 | .200 | 82.1 | −72.1 | −18.7 |

[1] Based on total solids.

TABLE XII.—Morpholine addition

| Percent morpholine added [1] | Number of samples | S/C ratio | Water retention percent | | Modulus of rupture, p.s.i. | | | | Sag, in. | Break load, lb. | Thickness, in. | Dry density p.c.f. | Percent change in sag | Percent change in MR |
|---|---|---|---|---|---|---|---|---|---|---|---|---|---|---|
| | | | Filter time, sec. | Pressure | Min. | Max. | Avg. | Standard deviation | | | | | | |
| 0—control | 4 | 0.6/1 | 83 | 45.4 | 29.5 | 4,270 | 4,360 | 4,320 | 29 | .108 | 119.2 | .281 | 86.3 | | |
| 0.05 | 4 | 0.6/1 | 87 | 46.1 | 30.3 | 4,280 | 4,360 | 4,310 | 36 | .096 | 120.0 | .282 | 86.5 | −11.1 | −0.2 |
| 0.10 | 4 | 0.6/1 | 85 | 45.1 | 29.0 | 4,170 | 4,470 | 4,350 | 145 | .118 | 118.4 | .278 | 86.3 | +9.3 | +0.7 |
| 0.5 | 4 | 0.6/1 | 89 | 44.6 | 29.3 | 4,280 | 4,560 | 4,410 | 142 | .112 | 119.4 | .278 | 86.1 | +2.8 | +2.1 |
| 1.0 | 4 | 0.6/1 | 90 | 44.9 | 29.2 | 4,410 | 4,570 | 4,480 | 70 | .133 | 120.0 | .277 | 86.4 | +23.1 | +3.7 |

[1] Based on total solids.

TABLE XIII.—Dimethyl ethanolamine addition and triisopropanolamine addition

| Percent dimethyl ethanolamine added [1] | Number of samples | S/C ratio | Water retention percent | | Modulus of rupture, p.s.i. | | | | Sag, in. | Break load, lb. | Thickness, in. | Dry density p.c.f. | Percent change in sag | Percent change in MR |
|---|---|---|---|---|---|---|---|---|---|---|---|---|---|---|
| | | | Filter time, sec. | Pressure | Min. | Max. | Avg. | Standard deviation | | | | | | |
| 0—control | 4 | 0.6/1 | 93 | 45.2 | 29.9 | 4,290 | 4,460 | 4,390 | 72 | .111 | 118.7 | .277 | 90.2 | | |
| 0.05 | 4 | 0.6/1 | 92 | 44.3 | 28.8 | 4,340 | 4,620 | 4,500 | 129 | .101 | 119.5 | .275 | 89.5 | −9.0 | +2.5 |
| 0.10 | 4 | 0.6/1 | 92 | 44.9 | 29.5 | 4,290 | 4,520 | 4,390 | 114 | .109 | 120.0 | .279 | 88.2 | −1.8 | |
| 0.5 | 4 | 0.6/1 | 94 | 44.9 | 29.9 | 4,300 | 4,410 | 4,370 | 53 | .109 | 120.2 | .280 | 87.8 | −1.8 | −0.5 |
| 1.0 | 4 | 0.6/1 | 93 | 42.6 | 29.3 | 4,130 | 4,350 | 4,240 | 89 | .106 | 116.9 | .280 | 87.4 | −4.5 | −3.4 |

| Percent triisopropanolamine added [1] | | | | | | | | | | | | | | |
|---|---|---|---|---|---|---|---|---|---|---|---|---|---|---|
| 0—control | 4 | 0.6/1 | 87 | 46.3 | 29.8 | 4,300 | 4,590 | 4,500 | 132 | .124 | 118.8 | .274 | 87.3 | | |
| 0.05 | 4 | 0.6/1 | 94 | 45.3 | 29.6 | 4,300 | 4,390 | 4,340 | 42 | .134 | 118.1 | .279 | 86.7 | +8.1 | −3.6 |
| 0.10 | 4 | 0.6/1 | 93 | 44.0 | 29.5 | 3,890 | 4,370 | 4,170 | 208 | .123 | 113.6 | .279 | 86.8 | −0.8 | −7.3 |
| 0.5 | 4 | 0.6/1 | 91 | 42.8 | 28.9 | 4,080 | 4,280 | 4,180 | 93 | .079 | 111.9 | .277 | 86.8 | −36.3 | −7.1 |
| 1.0 | 4 | 0.6/1 | 92 | 41.7 | 28.5 | 4,100 | 4,360 | 4,230 | 106 | .062 | 113.4 | .277 | 86.7 | −50.0 | −6.0 |

[1] Based on total solids.

TABLE XIV.—Monoethanolamine addition

| Percent monoethanolamine added [1] | Number of samples | S/C ratio | Water retention percent | | Modulus of rupture, p.s.i. | | | | Sag, in. | Break load, lb. | Thickness, in. | Dry density p.c.f. | Percent change in sag | Percent change in MR |
|---|---|---|---|---|---|---|---|---|---|---|---|---|---|---|
| | | | Filter time, sec. | Pressure | Min. | Max. | Avg. | Standard deviation | | | | | | |
| 0—control | 4 | 0.6/1 | 90 | 44.1 | 28.1 | 4,460 | 4,560 | 4,520 | 48 | .118 | 119.6 | .275 | 86.5 | | |
| 0.02 | 4 | 0.6/1 | 93 | 46.2 | 29.9 | 4,310 | 4,530 | 4,390 | 98 | .086 | 120.0 | .280 | 85.7 | −27.1 | −2.9 |
| 0.04 | 4 | 0.6/1 | 86 | 46.3 | 28.7 | 4,240 | 4,550 | 4,350 | 136 | .092 | 117.4 | .280 | 86.3 | −22.0 | −3.8 |
| 0.08 | 4 | 0.6/1 | 93 | 46.9 | 30.2 | 3,950 | 4,400 | 4,190 | 198 | .071 | 116.8 | .282 | 85.5 | −39.8 | −7.3 |
| 0.10 | 4 | 0.6/1 | 88 | 45.0 | 29.9 | 4,190 | 4,450 | 4,340 | 112 | .073 | 118.4 | .279 | 85.4 | −38.1 | −4.0 |
| 0—control | 4 | 0.6/1 | 83 | 46.0 | 29.2 | 4,390 | 4,560 | 4,490 | 75 | .122 | 120.2 | .277 | 88.5 | | |
| 0.5 | 4 | 0.6/1 | 84 | 45.1 | 30.9 | 4,260 | 4,510 | 4,390 | 121 | .017 | 118.5 | .278 | 88.2 | −86.1 | −2.2 |
| 1.0 | 4 | 0.6/1 | 84 | 46.3 | 32.1 | 4,060 | 4,120 | 4,100 | 95 | .017 | 116.3 | .285 | 86.7 | −86.1 | −8.7 |
| 1.5 | 4 | 0.6/1 | 84 | 47.2 | 32.8 | 4,060 | 4,240 | 4,140 | 75 | .018 | 117.5 | .287 | 86.3 | −85.2 | −7.8 |
| 2.0 | 4 | 0.6/1 | 85 | 46.5 | 32.7 | 3,820 | 4,290 | 4,070 | 236 | .014 | 117.7 | .288 | 85.5 | −88.5 | −9.4 |

[1] Based on total solids.

TABLE XV.—Diethanolamine addition

| Percent Diethanolamine added [1] | Number of samples | S/C ratio | Filler time, Sec. | Water retention percent Filter | Water retention percent Pressure | Modulus of rupture, p.s.i. Min. | Modulus of rupture, p.s.i. Max. | Modulus of rupture, p.s.i. Avg. | Standard deviation | Sag, in. | Break load, lb. | Thickness, in. | Dry density p.c.f. | Percent change in sag | Percent change in MR |
|---|---|---|---|---|---|---|---|---|---|---|---|---|---|---|---|
| 0—control | 4 | 0.6/1 | 86 | 44.1 | 28.5 | 4,390 | 4,600 | 4,480 | 107 | .112 | 120.0 | .277 | 85.8 | | |
| 0.02 | 4 | 0.6/1 | 84 | 44.9 | 30.9 | 4,120 | 4,350 | 4,290 | 115 | .022 | 119.9 | .284 | 85.7 | −80.4 | −4.2 |
| 0.04 | 4 | 0.6/1 | 84 | 45.9 | 31.3 | 4,030 | 4,360 | 4,220 | 150 | .013 | 116.6 | .282 | 85.8 | −88.4 | −5.8 |
| 0.08 | 4 | 0.6/1 | 90 | 45.1 | 32.2 | 3,850 | 4,130 | 3,960 | 126 | .010 | 113.1 | .286 | 84.3 | −91.1 | −11.6 |
| 0.10 | 4 | 0.6/1 | 85 | 45.2 | 32.9 | 4,060 | 4,240 | 4,120 | 83 | .014 | 116.2 | .287 | 84.5 | −87.5 | −8.0 |
| 0—control | 4 | 0.6/1 | 81 | 44.8 | 29.9 | 4,300 | 4,510 | 4,390 | 89 | .103 | 118.5 | .278 | 89.4 | | |
| 0.5 | 4 | 0.6/1 | 85 | 46.6 | 34.5 | 4,020 | 4,370 | 4,210 | 182 | .009 | 110.3 | .275 | 83.2 | −91.3 | −4.1 |
| 1.0 | 4 | 0.6/1 | 82 | 46.5 | 35.2 | 3,970 | 4,270 | 4,140 | 126 | .015 | 109.0 | .275 | 82.5 | −85.4 | −5.7 |
| 1.5 | 4 | 0.6/1 | 84 | 47.3 | 36.7 | 4,050 | 4,150 | 4,100 | 42 | .016 | 110.3 | .278 | 82.0 | −84.5 | −6.6 |
| 2.0 | 4 | 0.6/1 | 87 | 47.5 | 36.5 | 4,120 | 4,450 | 4,270 | 154 | .014 | 113.0 | .276 | 82.2 | −86.4 | −2.7 |

[1] Based on total solids.

TABLE XVI.—Triethanolamine addition

| Percent triethanolamine added [1] | Number of samples | S/C ratio | Filter time, sec. | Water retention percent Filter | Water retention percent Pressure | Modulus of rupture, p.s.i. Min. | Modulus of rupture, p.s.i. Max. | Modulus of rupture, p.s.i. Avg. | Standard deviation | Sag, in. | Break load, lb. | Thickness, in. | Dry density p.c.f. | Percent change in sag | Percent change in MR |
|---|---|---|---|---|---|---|---|---|---|---|---|---|---|---|---|
| 0—control | 4 | 0.6/1 | 94 | 42.3 | 28.3 | 4,400 | 4,680 | 4,580 | 124 | .133 | 124.0 | .278 | 86.2 | | |
| 0.02 | 3 | 0.6/1 | 98 | 44.4 | 29.3 | 5,120 | 5,440 | 5,260 | 162 | .028 | 143.3 | .279 | 85.6 | −78.9 | +14.8 |
| 0.04 | 4 | 0.6/1 | 97 | 44.0 | 30.1 | 5,070 | 5,200 | 5,140 | 56 | .018 | 142.0 | .281 | 85.2 | −86.5 | +12.2 |
| 0.06 | 4 | 0.6/1 | 91 | 43.9 | 31.4 | 4,620 | 4,970 | 4,830 | 164 | .016 | 135.0 | .283 | 84.5 | −88.0 | +5.5 |
| 0.08 | 4 | 0.6/1 | 94 | 44.7 | 31.8 | 4,400 | 4,910 | 4,650 | 269 | .014 | 135.0 | .288 | 84.1 | −89.5 | +1.5 |
| 0—control | 4 | 0.6/1 | 83 | 42.9 | 27.6 | 4,460 | 4,580 | 4,530 | 53 | .110 | 118.4 | .273 | 89.4 | | |
| 0.5 | 4 | 0.6/1 | 82 | 43.6 | 32.0 | 4,090 | 4,740 | 4,350 | 280 | .009 | 118.7 | .280 | 86.1 | −91.8 | −4.0 |
| 1.0 | 4 | 0.6/1 | 85 | 41.8 | 30.3 | 4,200 | 4,390 | 4,290 | 79 | .012 | 119.8 | .283 | 86.5 | −89.1 | −5.3 |
| 1.5 | 4 | 0.6/1 | 85 | 43.0 | 30.7 | 4,010 | 4,470 | 4,310 | 210 | .012 | 119.8 | .282 | 85.3 | −89.1 | −4.9 |
| 2.0 | 4 | 0.6/1 | 83 | 43.2 | 30.8 | 4,200 | 4,460 | 4,290 | 115 | .012 | 120.0 | .283 | 88.2 | −89.1 | −5.3 |

[1] Based on total solids.

Example VI

The distinctive application of this invention consisting of administering the preferred triethanolamine pursuant to the means thereof was applied to factory production employing full scale equipment in the manufacture of 14 inch diameter asbestos-cement pipe. An aqueous solution of 2.0% triethanolamine in amount of 0.05% by weight based upon the weight of the dry cement stock ingredients was applied according to the means of this invention by spraying such solution on the thin wet sheet of asbestos cement furnish ingredients carried on the felt machine belt subsequent to its collection by the cylinder filter mold and transfer to the belt, and prior to its accumulation build up and consolidation under pressure as a pipe section on the mandrel. The asbestos-cement stock throughout all production consisted of a furnish of 20% asbestos fiber, 30% silica and 50% portland cement. Production was begun without the application of the treatment of this invention continuing until 44 pipe sections were produced, then with the application of the stated 0.05% of triethanolamine for the production of the next 44 pipe sections, whereupon production was returned to the manufacture without the treatment for the final 44 pipe sections produced. The treatment pursuant to the means of this invention effected an 85 to 90% reduction in out-of-roundness without any change in hydrostatic MR, crush MR or density in the product. The measured sag of the pipe at 12 hours old and resultant decrease attributable to the invention from the standards under identical conditions, as well as other pertinent physical properties are given in Tables XVII and XVIII following:

TABLE VXII

[Out-of-roundness measurements—Pipe 12 hours old. Pipe measured: All pipe on bottom row of top deck (16 pipe per group) (results in inches)]

| Before run | | | Triethanolamine sprayed pipe | | | After run | | |
|---|---|---|---|---|---|---|---|---|
| Horizontal ID | Vertical ID | Out-of-roundness | Horizontal ID | Vertical ID | Out-of-roundness | Horizontal ID | Vertical ID | Out-of-roundness |
| 14.025 | 13.944 | 0.081 | 13.940 | 13.909 | 0.031 | 14.109 | 13.898 | 0.211 |
| 14.039 | 13.916 | 0.123 | 13.943 | 13.914 | 0.029 | 14.140 | 13.857 | 0.283 |
| 14.000 | 13.891 | 0.109 | 13.947 | 13.924 | 0.023 | 14.128 | 13.831 | 0.297 |
| 13.964 | 13.955 | 0.009 | 13.925 | 13.909 | 0.016 | 14.045 | 13.943 | 0.102 |
| 14.098 | 13.849 | 0.249 | 13.954 | 13.927 | 0.027 | 14.042 | 13.875 | 0.167 |
| 14.280 | 13.693 | 0.587 | 13.959 | 13.926 | 0.033 | 14.123 | 13.853 | 0.270 |
| 14.103 | 13.881 | 0.222 | 13.947 | 13.914 | 0.033 | 14.148 | 13.799 | 0.349 |
| 14.081 | 13.918 | 0.163 | 13.931 | 13.924 | 0.007 | 14.032 | 13.954 | 0.078 |
| 14.060 | 13.886 | 0.174 | 13.945 | 13.924 | 0.021 | 14.062 | 13.930 | 0.132 |
| 14.152 | 13.818 | 0.334 | 13.955 | 13.940 | 0.015 | 14.104 | 13.880 | 0.224 |
| 14.092 | 13.877 | 0.215 | 13.936 | 13.918 | 0.018 | 14.151 | 13.857 | 0.294 |
| 14.046 | 13.942 | 0.104 | 13.950 | 13.931 | 0.019 | 14.046 | 13.911 | 0.135 |
| 14.003 | 13.927 | 0.076 | 13.936 | 13.922 | 0.014 | 14.067 | 13.925 | 0.142 |
| 14.004 | 13.924 | 0.080 | 13.939 | 13.917 | 0.022 | 14.109 | 13.839 | 0.270 |
| 14.032 | 13.995 | 0.037 | 13.936 | 13.919 | 0.017 | 14.101 | 13.872 | 0.229 |
| 14.030 | 13.925 | 0.095 | 13.950 | 13.955 | 0.005 | 14.034 | 13.968 | 0.066 |
| Average | | 0.166 | | | 0.021 | | | 0.203 |

TABLE XVIII.—STRENGTH RESULTS

|  | Before run | Triethanol- amine run | After run |
|---|---|---|---|
| Hydrostatic MR (p.s.i.) |  |  |  |
| Minimum | 2,780 | 3,060 | 2,850 |
| Maximum | 3,290 | 3,260 | 3,105 |
| Average | 3,065 | 3,130 | 2,990 |
| Number | 4 | *3 | 4 |
| Crush MR (p.s.i.) |  |  |  |
| Minimum | 5,940 | 7,455 | 6,980 |
| Maximum | 6,910 | 6,910 | 7,050 |
| Average | 6,420 | 7,180 | 7,020 |
| Number | 2 | 2 | 2 |
| Density (p.c.f.) |  |  |  |
| Minimum | 112.2 | 112.2 | 112.0 |
| Maximum | 112.5 | 112.5 | 112.4 |
| Average | 112.4 | 112.4 | 112.2 |
| Number | 2 | 2 | 2 |

*One pipe burst at 60 p.s.i. and was probably damaged. Not included in average.

Example VII

In a factory run utilizing Southwestern cement, the pipe products produced without any treatment and those produced with the distinctive application of this invention were compared as handled promptly subsequent to withdrawal from the forming mandrel both without and with the end plugs which are commonly utilized to support the pipe ends while in an uncured or incompletely cured condition to preserve their initially substantially perfectly round configuration. Measurements showed about a 60% reduction in sagging out-of-round for the produced pipe having been treated pursuant to this invention and handled with end plugs as compared to untreated pipe handled with end plugs. Unplugged pipe produced in accordance with the invention showed 50% less sagging than untreated but plugged pipe, and 80% less sagging than unplugged and untreated pipe. The untreated pipe products and those treated with the specified amounts of triethanolamine applied, and those pipes plugged and unplugged, with the sag data for each determined at two hours after formation, are all identified and corresponding data given in the following Table XIX.

TABLE XIX.—OUT-OF-ROUNDNESS MEASUREMENTS

| Pipe diameter, inches | Percent triethanol- amine | Comments | Out-of-roundness, in. (2 hours old) Min. | Max. | Avg. | No. |
|---|---|---|---|---|---|---|
| 14 | (¹) | Plugged | 0.001 | 0.027 | 0.017 | 4 |
| 14 | 0.03 | Plugged | 0.005 | 0.010 | 0.007 | 4 |
| 14 | 0.03 | Not plugged | 0.002 | 0.022 | 0.009 | 4 |
| 14 | (¹) | Not plugged | 0.006 | 0.087 | 0.036 | 4 |
| 24 | 0.05 | Plugged | 0.015 | 0.075 | 0.040 | 4 |
| 24 | 0.05 | Not plugged | 0.093 | 0.126 | 0.108 | 4 |
| 24 | 0.05 | Plugged | 0.024 | 0.033 | 0.030 | 4 |
| 30 | 0.05 | Plugged | 0.146 | 0.149 | 0.148 | 2 |
| 30 | 0.05 | Plugged | 0.137 | 0.364 | 0.250 | 2 |

¹ None.

Example VIII

A long term factory run for a period of 36 hours of machine operation was conducted to evaluate continuous amine was applied at ratesETAOIN production. An 0.4% aqueous solution of triethanolamine was applied at rates to provide actual applications of 0.02 to 0.05% by weight of triethanolamine based upon the solid ingredients of the thin wet sheet. The application was made to the thin wet sheet of ingredients intermediate its collection and formation from the water suspension of stock ingredients, and its subsequent accumulation by convolutely superimposing upon the mandrel and compressing the same. As the result of the improved handleability of the pipe products produced due to the application of the combination of triethanolamine pursuant to the means of this invention, the machine speed and felt speed was increased from 80 to 90 feet per minute up to 100 to 110 feet per minute thereby increasing forming rate from about 200 pounds per minute to 275 pounds per minute or approximately a 30% increase in production. A random sampling of three consecutively produced pipes wherein the first and third samples had been produced pursuant to this invention and the second sample had no treatment was made and upon examining and measuring these pipe products to determine relative sag, the following results were obtained.

TABLE XX

| 18 inch pipe sample | Triethanol- amine treated, percent | Out-of- round, inches |
|---|---|---|
| 1 | 0.05 | 0.146 |
| 2 | (¹) | 0.520 |
| 3 | 0.05 | 0.071 |

¹ None.

Typical strength data as derived from assorted samples from the prolonged run showed no significant changes occurring, and inspection results established that out-of-round pipe rejects for sag sensitive large size pipe of up to 36 inches in diameter were significantly reduced when formed with the triethanolamine application pursuant to the means of administering this invention. In addition to the higher production rates and lower rejects, it was found that the pipe ends were easier to machine to tolerances for mating with couplings and adjacent pipe sections in both the amount of "shimming" required to mount the pipe sections on a lathe for machining and also in the amount of machining to achieve perfectly round pipe ends, there was a decided reduction in the need for the use of semi-cradle or saddle supports in subsequent handling and stacking, and an improvement in the application of resin coating or lining and use of apparatus associated therewith.

By far the predominate asbestos-cement products produced by the wet process method comprising collecting the ingredients from a water suspension as a thin wet sheet and thereafter accumulating the material by superimposing the sheet as a laminate to build up or accumulate a body and consolidate the layers thereof integrating them into a continuous mass, is pipe, and a common utility of such pipe being potable water lines, the extractability of the triethanolamine from the asbestos-cement water pipe products of this invention was determined from pipe samples made with 0.02% triethanolamine based on the weight of the solids constituents and compared with a like tested sample made without any additament. Two samples of 6 inch treated and untreated water pipe with ends plugged were loaded with distilled water and each sample rotated at 58 r.p.m. on a roll table for 14 days. At the end of the two week period the water content from each pipe was analyzed for triethanolamine content. The test results showed that no triethanolamine could be found in the water contained in the triethanolamine treated pipe. Moreover the Federal Register of the Food and Drug Administration approved triethanolamine for use in various products which will contact food as listed under 9 sections of the Register. It therefore appears that the pipe products of this invention would be completely safe for use in potable water lines. Further analytical examination of the asbestos-cement material itself obtained from a triethanolamine treated pipe gave results establishing that 92% of the triethanolamine remained insoluble when 1,000 grams of pulverized solids from the pipe composition was leached with 2,500 grams of distilled water for 6 hours with mechanical shaking. It was also determined that the presence of triethanolamine made no difference in fungus growth.

The asbestos-cement furnish ingredients with which the application of this invention is effective in significantly reducing sag without introducing deleterious results such as loss of strength, comprise asbestos-cement formulations common to the industry wherein the hydraulic cement component consists essentially of typical commercial portland cements as described, for example, in page 14 et seq. of Lea and Desch, The Chemistry of Cement and Concrete, revised edition, 1956. Specifically the furnish ingredients comprise approximately 10 to approximately 40% by weight of asbestos fiber, approximately 30 to approximately 70% by weight of portland type hydraulic setting cement, and 0 to approximately 50% by weight of silica, with normally at least approximately 10% or more by weight of silica content for steam cured products. Silica, however, may be included as a low cost filler or fine aggregate in normal cured products wherein it remains substantially inert taking no part in chemical activity.

In steam cured or autoclaved products, the hydrothermal conditions cause the silica, or a portion thereof, to react with components such as lime of the portland cement to produce cementitious hydrated calcium silicate gels, all pursuant to well known cement technology and practice. For the manufacture of asbestos-cement pipe, most typical furnish formulaitons are within the approximate weight ranges of 10 to 30% of asbestos fiber, 20 to 40% of silica, and 40 to 60% of portland cement. A preferred formulation for pipe is about 20% by weight of asbestos fiber, about 30% by weight of silica, and about 50% by weight of a commercial portland cement.

Although this invention is particularly directed to the manufacture of asbestos-cement pipe, or duct and other hollow body or cylindrical-like bodies which are prone to slumping or sagging, it would be applicable in the manufacture of other products from asbestos-portland cement with similar formation procedures wherein slumping constitutes a problem. Forming procedures to which this invention is applicable comprise the type illustrated by the Hatschek U.S. Letters Patent No. 769,078 and Reissue No. 12,594, and the more advanced processes of U.S. Letters Patent No. 2,182,353; No. 2,246,537; and No. 2,322,592. These proceses all entail the common manufacturing technique of dispersing the components of the product comprising hydraulic cement and fiber in water in such concentrations as to provide a dilute water suspension of the ingredients, typically in proportions of about 10 to about 20 parts by weight of water per part by weight of solids, as a forming stock or furnish, collecting or depositing a thin wet sheet of the components with some entrained liquid from the suspension wlth a filter screen activated by a hydraulic pressure differential, and thereafter superimposing to accumulate a multiplicity of such thin wet sheets upon each other as by convolute winding one or more sheets about a forming mandrel and consolidating the compoiste body of sheets with pressure into an integrated, monolithic-like mass of designed thickness and density. A felt belt is normally utilized to continuously transfer the thin wet sheet of ingredients from the collection means or filter to the superimposing means or accumulaing mandrel roll as shown in the prior art. This felt belt, while conveying and supporting the thin wet sheet, is also normally provided with means to assist in dewatering the thin sheet, such as a vacuum box or boxes located beneath the belt, prior to accumulation.

It will be understood that the foregoing details are given for purposes of illustration, not restriction, and the variations within the spirit of the invention are intended to be included within the scope of the appended claims.

What I claim is:

1. An improved method of forming asbestos-hydraulic cement products from a water suspension of the ingredients primarily including asbestos fiber and hydraulic setting portland cement, comprising: providing a furnish of a water suspension of the ingredients comprising asbestos fiber and hydraulic cement consisting essentially of portland cement by dispersing the ingredients in water; collecting from the water suspension a thin wet sheet of the ingredients comprising the asbestos fiber and portland cement; the improvement consisting of quickening the initial set of the hydraulic cement such that the product effectively resists sag within a period of about 30 minutes by applying to the said thin wet sheet of ingredients comprising asbestos fiber and hydraulic cement consisting essentially of portland cement a dilute aqueous solution of at least approximately 0.01 to approximately 2.0% by weight, based upon the weight of the solid ingredients of the furnish constituting the said thin wet sheet, of at least one alkanol amine selected from the group consisting of monoethanolamine, diethanolamine and triethanolamine; and thereafter accumulating layers of the alkanol amine containing a thin wet sheet of ingredients comprising abestos fiber and hydraulic cement consisting essentially of portland cement by superimposing said sheet into a laminated body and consolidating the laminated body integrating the layers thereof into a monolithic mass.

2. The improved method of forming asbestos-cement products of claim 1 wherein the amount of the said alkanol amine applied to the thin wet sheet of ingredients comprising asbestos fiber and portland cement is approximately 0.02 up to approximately 2.0% by weight based upon the weight of the solid ingredients of the furnish of the said thin wet sheet.

3. The improved method of forming asbestos-cement products of claim 1 wherein the collected, alkanol amine containing thin wet sheet of ingredients comprising asbestos and portland cement is superimposed into a laminated body and consolidated to integrate the laminated body into a monolithic mass by convolutely winding and accumulating the said thin wet sheet upon itself on a mandrel roll to provide the laminated body structure and by applying pressure to the thus convolutely wound and accumulated laminated body to integrate the body into a monolithic mass.

4. The improved method of forming asbestos-cement products of claim 3 wherein the amount of the said alkanol amine applied to the thin wet sheet of ingredients comprising asbestos fiber and portland cement is approximately 0.02 to approximately 1.0% by weight based upon the weight of the solid ingredients of the furnish constituting the thin wet sheet.

5. The improved method of forming asbestos-cement products of claim 4 wherein the furnish ingredients include silica.

6. The improved method of forming asbestos-cement products of claim 3 wherein the furnish ingredients comprise approximately 10 to approximately 40% by weight of asbestos fiber, approximately 10 to approximately 50% by weight of silica and approximately 30 to approximately 70% by weight of portland cement.

7. The improved method of forming asbestos-cement products of claim 1 wherein the thus formed monolithic mass of the asbestos cement product is air cured.

8. The improved method of forming asbestos-cement products of claim 6 wherein the thus formed monolithic mass of the asbestos cement product is steam cured.

9. The improved method of forming asbestos-cement products of claim 6 wherein the dilute aqueous solution of approximately 0.01 to approximately 2.0% by weight based upon the weight of the solid ingredients of the furnish of the said wet sheet of at least one alkanol amine selected from a group consisting of monoethanolamine, diethanolamine and triethanolamine is applied in a solution concentration of approximately 0.1 to approximately 5.0% by weight of the aqueous solution.

10. The improved method of forming asbestos-cement products of claim 3 wherein the furnish ingredients comprise approximately 10 to 30% by weight of asbestos fiber, approximately 20 to 40% by weight of silica and approximately 40 to 60% by weight of portland cement.

References Cited

UNITED STATES PATENTS

| | | | |
|---|---|---|---|
| 2,031,621 | 2/1936 | Tucker | 106—90 |
| 3,269,888 | 8/1966 | Yang | 106—99X |
| 2,437,842 | 3/1948 | Uhler | 106—90 |
| 2,987,407 | 6/1961 | Ulfstedt et al. | 106—103X |
| 2,791,159 | 5/1957 | Lillis | 162—154X |

S. LEON BASHORE, Primary Examiner

R. H. TUSHIN, Assistant Examiner

U.S. Cl. X.R.

106—90, 99, 314, 315; 162—181